US011348270B2

(12) United States Patent
Jeon et al.

(10) Patent No.: US 11,348,270 B2
(45) Date of Patent: May 31, 2022

(54) METHOD FOR STEREO MATCHING USING END-TO-END CONVOLUTIONAL NEURAL NETWORK

(71) Applicant: Research & Business Foundation Sungkyunkwan University, Suwon-si (KR)

(72) Inventors: Jaewook Jeon, Suwon-si (KR); Phuoc Tien Nguyen, Suwon-si (KR); Jinyoung Byun, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/005,632

(22) Filed: Aug. 28, 2020

(65) Prior Publication Data
US 2021/0065393 A1    Mar. 4, 2021

(30) Foreign Application Priority Data
Aug. 28, 2019    (KR) .......................... 10-2019-0106008

(51) Int. Cl.
| | |
|---|---|
| *G06T 7/593* | (2017.01) |
| *G06K 9/62* | (2022.01) |
| *G06T 9/00* | (2006.01) |

(52) U.S. Cl.
CPC ............ *G06T 7/593* (2017.01); *G06K 9/6232* (2013.01); *G06T 9/002* (2013.01); *G06T 2207/10028* (2013.01); *G06T 2207/20084* (2013.01)

(58) Field of Classification Search
CPC ................. G06T 2207/10028; G06T 7/593; G06T 9/002
See application file for complete search history.

(56) References Cited

PUBLICATIONS

Chang et al., "Pyramid Stereo Matching Network," arXiv:1803.08669v1, (Mar. 23, 2018) (Year: 2018).*
Du et al, "AMNet: Deep Atrous Multiscale Stereo Disparity Estimation Networks," arXiv:1904.09099v1. (Apr. 19, 2019) (Year: 2019).*
Chang, Jia-Ren et al., "Pyramid Stereo Matching Network." *Proceedings of the IEEE Conference on Computer Vision and Pattern Recognition*, Mar. 23, 2018 (pp. 1-9).
Du, Xianzhi et al., "Amnet: Deep Atrous Multiscale Stereo Disparity Estimation Networks." arXiv preprint arXiv:1904.09099, Apr. 19, 2019 (pp. 1-25).
Korean Office Action dated Sep. 25, 2020 in counterpart Korean Patent Application No. 10-2019-0106008 (6 pages in Korean).

* cited by examiner

*Primary Examiner* — Ross Varndell
(74) *Attorney, Agent, or Firm* — NSIP Law

(57) ABSTRACT

Disclosed is a stereo matching method for generating a disparity map from a stereo image. The stereo matching method may include obtaining a cost volume by applying a first convolutional neural network (CNN) and a second CNN to a left image and a right image, respectively, wherein the cost volume is determined based on feature maps extracted from the left image and the right image, respectively, performing normalization on the cost volume by applying a third CNN, up-sampling the normalized cost volume, and obtaining a disparity map by applying regression analysis to the up-sampled cost volume.

10 Claims, 6 Drawing Sheets

【FIG. 1】
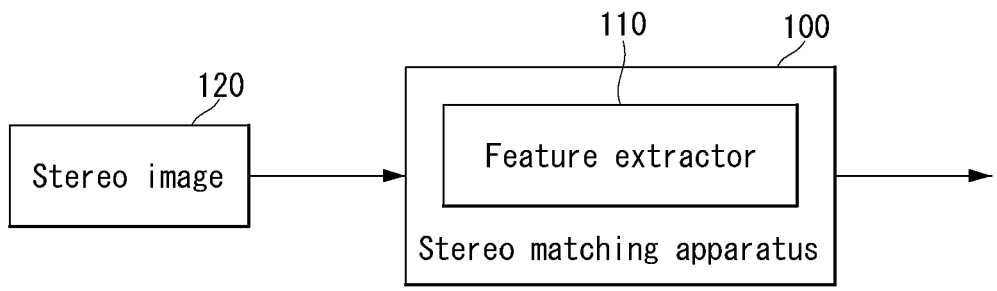
【FIG. 2】
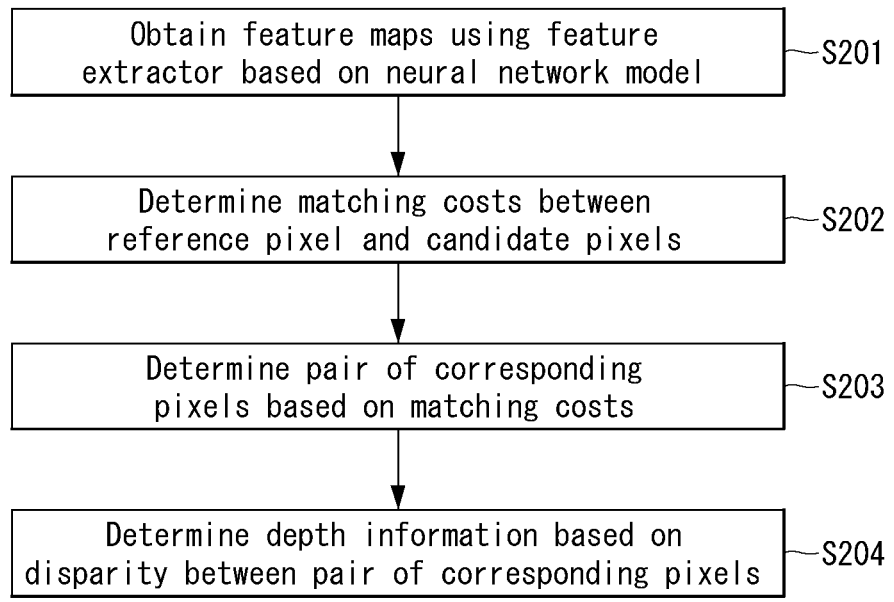

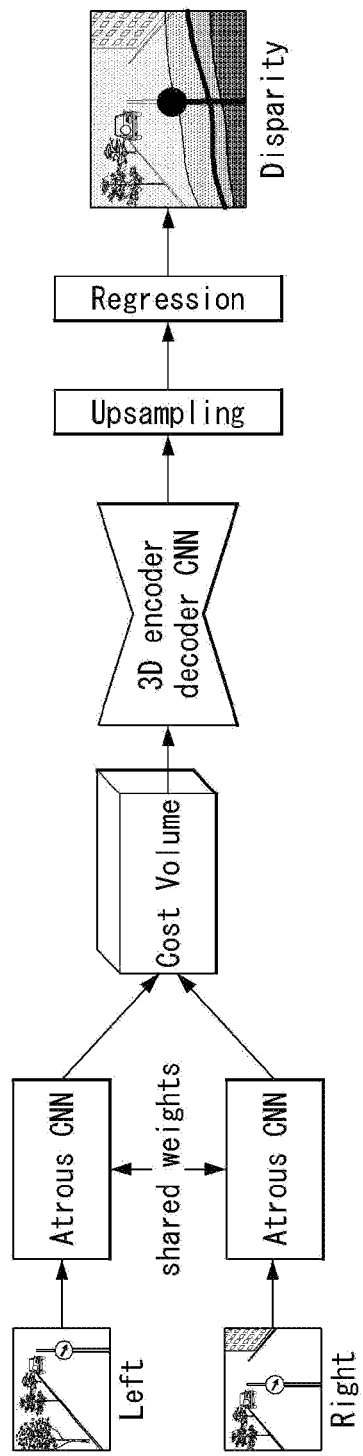
[FIG. 3]

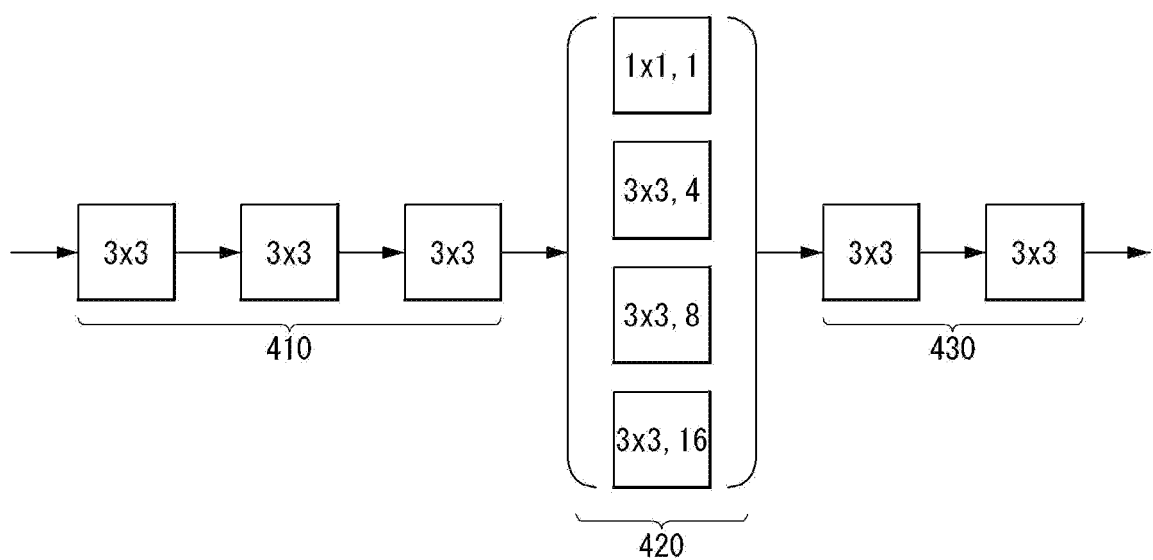
[FIG. 4]

[FIG. 5]
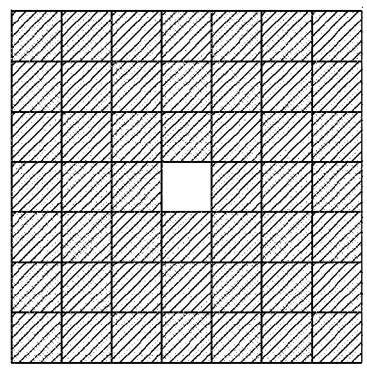
(a)
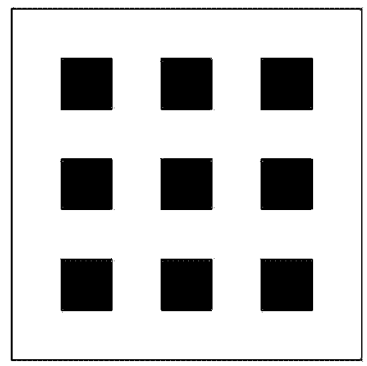
(b)
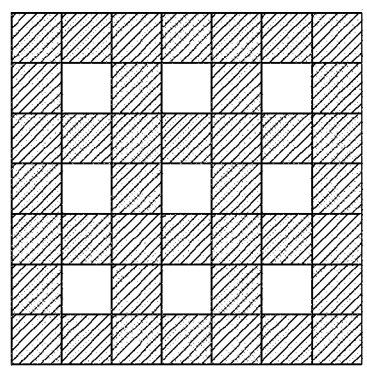
(c)

【FIG. 6】
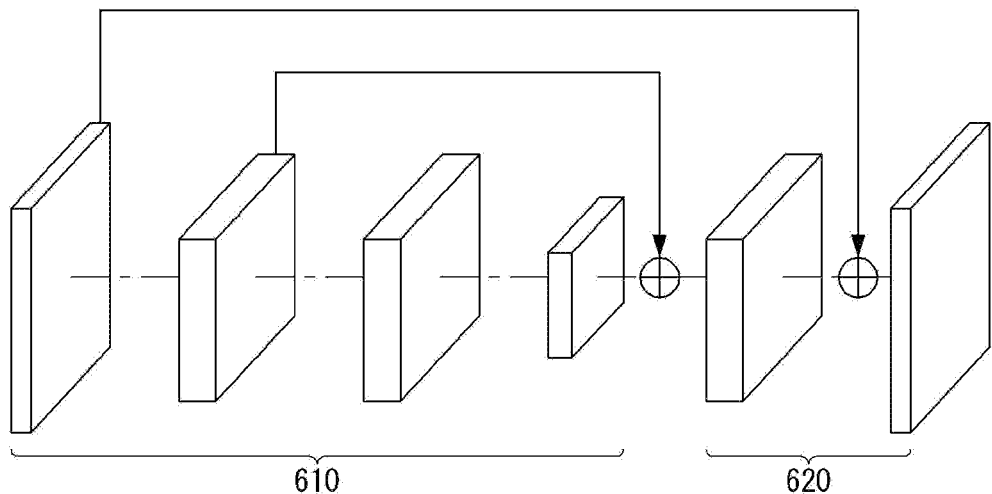
【FIG. 7】
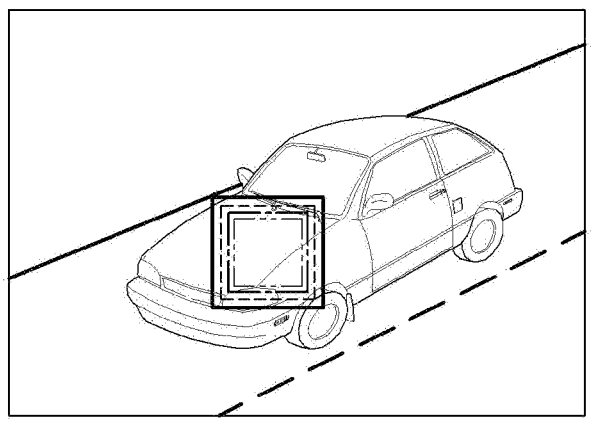
(a)
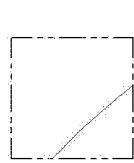
(b)
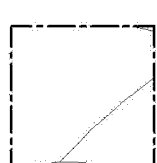
(c)
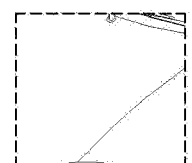
(d)
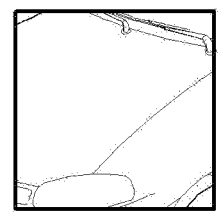
(e)

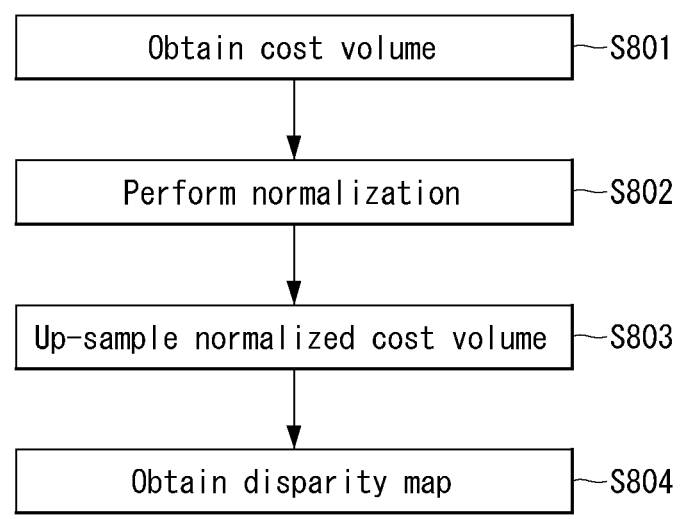
[FIG. 8]
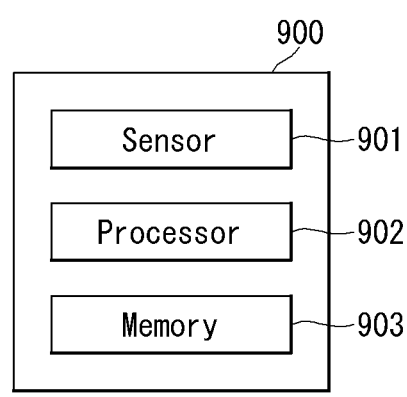
[FIG. 9]

US 11,348,270 B2

METHOD FOR STEREO MATCHING USING END-TO-END CONVOLUTIONAL NEURAL NETWORK

This application claims the priority benefit of Korean Patent Application No. 10-2019-0106008 filed on Aug. 28, 2019, which is incorporated herein by reference for all purposes as if fully set forth herein.

BACKGROUND OF THE DISCLOSURE

Field of the Present Disclosure

The present disclosure relates to a stereo matching technology and, more particularly, to a technology for obtaining a disparity map from a stereo image using an end-to-end convolutional neural network.

Related Art

A stereo matching technology is used to obtain a three-dimensional (3D) image from a stereo image and to obtain a 3D image from multiple two-dimensional (2D) images of the same subject captured at different photographing locations on the same line. As described above, a stereo image means multiple 2D images of the subject captured at different photographing locations.

In general, in order to generate a 3D image from a 2D image, z coordinates, that is, depth information, are necessary in addition to x and y coordinates, that is, vertical and horizontal location information of the 2D image. In order to obtain the z coordinates, parallax information of a stereo image is necessary. Stereo matching is a technology used to obtain such parallax. For example, if a stereo image corresponds to left and right images captured by two left and right cameras, one of the left and right images is determined as a reference image, and the other thereof is determined as a search image. In such a case, a distance between the reference image and the search image for the same one point on the space, that is, a difference between coordinates, is called parallax. The parallax is obtained using the stereo matching technology.

Depth information of each pixel is obtained using pieces of parallax between a reference image and a search image with respect to all pixels of an image. A disparity map expressed as 3D coordinates is generated based on the depth information. An example of a common stereo matching technology used to obtain parallax between a reference image and a search image is schematically described below.

First, a window having a specific size is set based on the reference pixel of a reference image, and windows having the same are set based on the search pixels of a search image. The reference pixel is a pixel whose corresponding point, that is, correspondence point, needs to be now searched for in the search image, among the pixels of the reference image. The search pixel means a pixel whose point needs to be determined of whether it is a correspondence point for the reference pixel, among the pixels of the search image. The window has a matrix form configured with a center pixel and surrounding pixels surrounding the center pixel.

Similarity between pixels within a reference pixel window and pixels within each search pixel window set as described above is computed. A search pixel of a search pixel window that belongs to the search pixel windows and that has the greatest similarity value with the reference pixel window is defined as a correspondence pixel corresponding to a correspondence point. Furthermore, a distance between the reference pixel and the correspondence pixel is obtained as parallax.

A method of obtaining and comparing an average value of the pixels within the reference pixel window and an average of the pixels within the search pixel window is used as a method of calculating similarity between pixels within the reference pixel window and pixels within the search pixel window.

SUMMARY OF THE DISCLOSURE

In an aspect of the present disclosure, a stereo matching method for generating a disparity map from a stereo image may include obtaining a cost volume by applying a first convolutional neural network (CNN) and a second CNN to a left image and a right image, respectively, wherein the cost volume is determined based on feature maps extracted from the left image and the right image, respectively, performing normalization on the cost volume by applying a third CNN, up-sampling the normalized cost volume, and obtaining a disparity map by applying regression analysis to the up-sampled cost volume.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure. In the drawings:

FIG. 1 is a diagram for describing an operation of a stereo matching apparatus according to an embodiment of the present disclosure.

FIG. 2 is a flowchart illustrating an operation of a stereo matching method according to an embodiment of the present disclosure.

FIG. 3 is a diagram illustrating a method of obtaining a disparity map from a stereo image according to an embodiment to which the present disclosure is applied.

FIG. 4 is a diagram illustrating the structure of an Atrous CNN according to an embodiment to which the present disclosure is applied.

FIG. 5 is a diagram illustrating resulting images of the Atrous CNNs according to an embodiment to which the present disclosure is applied.

FIG. 6 is a diagram illustrating the structure of a 3D encoder-decoder CNN according to an embodiment to which the present disclosure is applied.

FIG. 7 illustrates an example of an area to which the Atrous CNN is applied according to an embodiment to which the present disclosure is applied.

FIG. 8 is a flowchart illustrating a stereo matching method for generating a disparity map from a stereo image according to an embodiment of the present disclosure.

FIG. 9 illustrates a stereo matching apparatus according to an embodiment of the present disclosure.

DESCRIPTION OF EXEMPLARY EMBODIMENTS

Reference will now be made in detail to embodiments of the present disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the present disclosure.

FIG. 1 is a diagram for describing an operation of a stereo matching apparatus 100 according to an embodiment of the present disclosure.

Referring to FIG. 1, the stereo matching apparatus 100 according to an embodiment receives a stereo image 120 and determines depth information based on the stereo image 120. The stereo image 120 includes different viewpoint images (e.g., a left image and a right image) obtained through two or more cameras. The viewpoint images are images photographed at different locations (or viewpoints) at the same time. The stereo image 120 may be obtained by a stereo camera, for example.

According to another embodiment, the stereo matching apparatus 100 may determine depth information based on a multi-view image including three or more viewpoint images. Hereinafter, embodiments are described based on the stereo image 120 configured with two viewpoint images, for convention of description.

The stereo matching apparatus 100 may search the stereo image 120 for a pair of corresponding pixels, and may determine depth information of an object and the background based on disparity, that is, a difference between the locations of the pair of corresponding pixels. The depth information may be used to render a 3D image or to estimate a distance up to the object or the background at the viewpoint of a camera.

For example, the depth information may be used to estimate a distance up to a vehicle or obstacle that is located ahead using the stereo camera in a navigation system for a vehicle. For another example, in an augmented reality (AR) image, a real object and a virtual object may be mixed and expressed. A location within an image, which will express the virtual object, may be determined based on depth information of the real object. The stereo matching apparatus 100 may be implemented as one or more software modules, one or more hardware modules, or various combinations of them.

The stereo matching apparatus 100 determines depth information through stereo matching. The stereo matching includes a process of extracting the feature of each of pixels included in the stereo image 120 and a process of searching for a correspondence pixel of each pixel by comparing extracted features of the stereo images 120 and predicting disparity. Illustratively, the stereo matching apparatus 100 may detect, in a right image, a correspondence pixel of a pixel included in a left image, or may detect, in the left image, a correspondence pixel of a pixel included in the right image. In order to search for the correspondence pixel, the stereo matching apparatus 100 may use intensity information, color information, or gradient information of a pixel or any combination of them. The stereo matching apparatus 100 determines disparity based on a difference between the locations of detected correspondence pixels. In an embodiment of the present disclosure, any one of a left image and a right image may be denoted as a first viewpoint image, and the other thereof may be denoted as a second viewpoint image.

The stereo matching apparatus 100 performs stereo matching using a feature extractor 110 based on a neural network model. A deep neural network model including several layers may be used as the neural network model. The feature of an image can be estimated accurately and rapidly because the feature extractor 110 based on a neural network model is used. The neural network model is a statistical model that simulates the characteristics of a neural network of biology. The neural network model has a problem solving ability to output preferred results from input information. In order to increase the problem solving ability, a process of training (or learning) artificial neurons (or nodes) that form a network by a combination of synapses is performed. Values of parameters that form the neural network model through the training (or learning) process can be modified more preferably.

The stereo matching apparatus 100 may extract the features (or feature vectors) of pixels within each viewpoint image using the feature extractor 110 based on a neural network model, and may determine similarity between the pixels, which is used to determine a correspondence pixel, through the calculation of a feature distance. The stereo matching apparatus 100 extracts the features of a viewpoint image more accurately and rapidly using the neural network model, and determines similarity between the extracted features through the calculation of a feature distance having relatively low computational complexity, thus being capable of maintaining high precision and reducing computational complexity. Accordingly, stereo matching can be performed accurately and rapidly.

FIG. 2 is a flowchart illustrating an operation of a stereo matching method according to an embodiment of the present disclosure.

The stereo matching method proposed in an embodiment of the present disclosure may be performed by the stereo matching apparatus of FIG. 1. Referring to FIG. 2, at step S201, the stereo matching apparatus obtains the feature maps of different viewpoint images using the feature extractor based on a neural network model. For example, the stereo matching apparatus may extract the first feature vectors of pixels included in a first viewpoint image and the second feature vectors of pixels included in a second viewpoint image using the feature extractor, and may obtain the first feature map and second feature map of the first viewpoint image and second viewpoint image, respectively. The first feature map includes information on the first feature vectors of the pixels included in the first viewpoint image. The second feature map includes information on the second feature vectors of the pixels included in the second viewpoint image.

In one embodiment, the stereo matching apparatus may obtain a feature map on an image basis. The feature extractor may receive image information of a first viewpoint image, and may determine feature vectors that form a first feature map based on the input image information. The image information of the first viewpoint image may be pixel information, such as intensity information, color information or gradient information of pixels included in the first viewpoint image or any combination of them, for example. When receiving the image information of the first viewpoint image, the feature extractor determines a feature vector corresponding to each of the pixels of the first viewpoint image. For example, the feature extractor may determine a feature vector corresponding to a reference pixel based on pixel information of pixels included in one area (e.g., patch area) on the basis of the reference pixel of the first viewpoint image. The feature extractor may determine a feature vector corresponding to each of the pixels included in the first viewpoint image by performing such a process on other pixels without any change. As in the process of determining, by the feature extractor, the feature vectors forming the first feature map, the feature extractor may receive image information of the second viewpoint image, and may determine feature vectors that form the second feature map based on the input image information.

In another embodiment, the stereo matching apparatus may obtain a feature map based on patch areas. The patch area indicates a pixel area including a plurality of pixels, such as an 8×8 pixel block, for example. The stereo matching apparatus may obtain the first feature map based on the patch areas of the first viewpoint image, and may obtain the second feature map based on the patch areas of the second viewpoint image. For example, the feature extractor may receive information of a patch area around the reference pixel of the first viewpoint image, and may determine the feature vector of the reference pixel based on the input information of the patch area. In this case, the feature extractor may receive intensity information, color information or gradient information of pixels included in the patch area or any combination of them. Since the feature of the reference pixel is determined by taking surrounding pixels into consideration, the probability that a determined feature of the reference pixel may have a more accurate value may be increased. Likewise, the feature extractor may receive information of a patch area around a candidate pixel of the second viewpoint image, and may determine the feature vector of the candidate pixel based on the input information of the patch area. In this case, the feature extractor may receive intensity information, color information or gradient information of pixels included in the patch area or any combination of them. The candidate pixel is a pixel of the second viewpoint image, that is, a target of comparison, in determining a pixel of the second viewpoint image corresponding to the reference pixel of the first viewpoint image. In one embodiment, the candidate pixel may be a pixel of the second viewpoint image, which is located on a line including a point corresponding to the reference pixel of the first viewpoint image.

At steps S202 and S203, the stereo matching apparatus determines a pair of corresponding pixels between the viewpoint images using the feature maps. The stereo matching apparatus uses similarity between the feature vectors in order to determine the pair of corresponding pixels. In this case, a matching cost between the pixels may be used as the similarity. The stereo matching apparatus may determine, as a correspondence pixel of a reference pixel, a pixel having an optimal matching cost among candidate pixels.

First, at step S202, the stereo matching apparatus determines matching costs between the reference pixel of the first viewpoint image and the candidate pixels of the second viewpoint image using the first feature map of the first viewpoint image and the second feature map of the second viewpoint image. The stereo matching apparatus may calculate a difference (or vector distance) between the feature vector of the reference pixel and the feature vector of each of the candidate pixels, and may determine the matching cost based on the calculated difference. Illustratively, the stereo matching apparatus may calculate a Euclidean distance between feature vectors as a difference between the feature vector of the reference pixel and the feature vector of each of the candidate pixels, and may determine the matching cost based on the calculated Euclidean distance. In this case, the stereo matching apparatus may normalize the calculated Euclidean distance or may apply weight to the Euclidean distance.

In one embodiment, the matching cost may have a characteristic proportional to a value of the Euclidean distance. A matching cost having a great value means that similarity between two pixels, that is, a target of comparison, is low. In contrast, a matching cost having a small value means that similarity between two pixels, that is, a target of comparison, is high.

According to another embodiment, the stereo matching apparatus may perform matching cost optimization or a matching cost aggregation after determining a matching cost between a reference pixel and a candidate pixel.

For example, the stereo matching apparatus may determine an initial matching cost between a reference pixel and a candidate pixel, and may adjust the initial matching cost based on matching cost information of another reference pixel neighboring the reference pixel. Through such a process, the accuracy of the matching cost can be increased, and an influence attributable to wrong information can be reduced.

At step S203, the stereo matching apparatus determines a pair of corresponding pixels between the first viewpoint image and the second viewpoint image based on the determined matching costs. The stereo matching apparatus determines, as a correspondence pixel of the reference pixel, a candidate pixel that belongs to the candidate pixels of the second viewpoint image and that has an optimal matching cost. For example, the stereo matching apparatus may determine, as a correspondence pixel of the reference pixel, a candidate pixel that belongs to the candidate pixels and that has a matching cost having the smallest value.

If steps S202 and S203 are performed on all patch areas included in the first viewpoint image, a pair of corresponding pixels between the first viewpoint image and the second viewpoint image may be determined.

At step S204, the stereo matching apparatus determines depth information based on a disparity between the pair of corresponding pixels. In one embodiment, the stereo matching apparatus may determine depth information based on a disparity between the reference pixel and a correspondence pixel corresponding to the reference pixel, and may generate a depth map based on the depth information. In this case, a disparity map including disparity information between reference pixels included in the first viewpoint image and the correspondence pixels of the second viewpoint image may be used.

Context information of an object is necessary for correspondence estimation. In order to learn feature information for wide context information, for example, a convolution neural network (CNN) needs to be designed using a kernel size having a large size, such as 5×5 or 7×7. However, a conventional stereo matching technology has a problem in that a very large calculation cost occurs because more parameters are necessary for a network.

Accordingly, in order to solve such a problem, there is proposed a method of performing stereo matching by applying an Atrous CNN, that is, a CNN having other extension levels.

Furthermore, the present disclosure proposes a method of designing a network, wherein feature information is extracted from a stereo image based on an Atrous CNN.

Furthermore, the present disclosure proposes a method of searching for wide context information by extracting feature maps using several convolutional layers having different Atrous values and aggregating the feature maps.

The present disclosure proposes a method of applying a stacked 3D encoder-decoder in order to solve the cost volume size problem.

According to an embodiment of the present disclosure, wide context information can be effectively obtained, and spatial resolution can be maintained in an environment to which the CNN is applied.

Furthermore, an embodiment of the present disclosure has an advantage in that the number of parameters identical with that of the existing stereo matching technology can be maintained while using wide context information.

FIG. 3 is a diagram illustrating a method of obtaining a disparity map from a stereo image according to an embodiment to which the present disclosure is applied.

Referring to FIG. 3, the stereo matching apparatus (100 in FIG. 1) may obtain a cost volume by applying a CNN to each of a left image and a right image. The cost volume may be determined based on feature maps extracted from the left image and the right image, respectively. For example, the cost volume may be configured with feature maps extracted from a stereo image, and may be used for a cost aggregation.

In an embodiment of the present disclosure, the stereo matching apparatus may use the CNN for the feature extraction step and the cost aggregation step. Furthermore, in an embodiment of the present disclosure, the stereo matching apparatus may include a feature extraction network using an Atrous CNN in order to search for or obtain wide context information. In other words, the CNN applied to each of the left image and the right image may be configured as an Atrous CNN including an extended convolutional layer. The Atrous CNN may be denoted as an extended CNN, and the structure of the Atrous CNN is described in detail later.

Thereafter, the stereo matching apparatus may perform normalization on the cost volume by applying a 3D encoder-decoder. In an embodiment of the present disclosure, the 3D encoder-decoder may be denoted as a 3D CNN or a 3D CNN layer. The structure of the 3D encoder-decoder is described in detail later. Furthermore, the stereo matching apparatus performs up-sampling in order to restore a portion whose size has been compressed in the process of applying the 3D encoder-decoder to the original size.

The stereo matching apparatus performs regression (or regression analysis) because it has reduced and used a disparity value in order to reduce the size of data. In other words, the stereo matching apparatus obtains the final disparity map by applying regression analysis to the up-sampled cost volume.

In one embodiment of the present disclosure, in order to determine a context relation based on a pixel value, object context information and feature information of an image may be together used. Accordingly, the results of correspondence estimation can be improved.

In one embodiment, a relationship between an object (e.g., a vehicle or a pedestrian) and a lower area (e.g., a road, a building, a window or a vehicle wheel) may be learnt by an Atrous CNN, so hierarchical context may be formed.

FIG. 4 is a diagram illustrating the structure of the Atrous CNN according to an embodiment to which the present disclosure is applied.

Referring to FIG. 4, the Atrous CNN proposed in an embodiment of the present disclosure may include a plurality of convolutional layers (or CNN layers). In FIG. 4, each box (or block) indicates the kernel size of each convolutional layer and/or one convolutional layer having each Atrous value. For convention of description, hereinafter, layers including a plurality of convolutional layers are grouped and described as a single CNN layer (410, 420, and 430).

In one embodiment, the stereo match apparatus reduces the size of a stereo image by applying a first CNN layer 410 including the first three CNNs, and outputs a feature map. Thereafter, the stereo match apparatus applies a second CNN layer 420, having a different Atrous value, to the feature map, that is, the output of the first CNN layer 410.

In an embodiment of the present disclosure, the second CNN layer 420, that is, an Atrous CNN layer, is used to perform stereo matching. Accordingly, great context information can be obtained, and spatial resolution can be preserved within a convolutional network.

In one embodiment, the stereo match apparatus may sequentially use (or apply) a 1×1 convolutional layer having an Atrous value of 1 and three 3×3 layers having respective Atrous values of 4, 8 and 16. For example, the outputs of all the convolutional layers within the second CNN layer 420 may be connected (or merged or combined) before they are transmitted to the last third CNN layer 430 including two CNNs.

FIG. 5 is a diagram illustrating resulting images of the Atrous CNNs according to an embodiment to which the present disclosure is applied.

It is assumed that FIG. 5(a) is an input image. FIG. 5(b) illustrates a convolution operation when an Atrous value is 2. If convolution, such as that illustrated in FIG. 5(b), is applied, a convolutional layer having an Atrous value of 2 may output a resulting image of the input image illustrated in FIG. 5(a), such as that illustrated in FIG. 5(c).

The stereo match apparatus may generate two feature maps by transmitting both a left image and a right image over the same Atrous CNN. The stereo match apparatus may configure a matching cost volume including abundant context information using the feature maps of a stereo image to which the proposed Atrous CNN has been applied. That is, the stereo match apparatus may form a cost volume using feature maps obtained from a left image and a right image, without using a distance metric, such as a cosine similarity function or an L1/L2 distance function.

In one embodiment, the stereo match apparatus may form a 4D volume, that is, H(height)*W(width)*D(disparity)*F (feature size), by connecting the left feature map and the right feature map with respect to each disparity value. In this case, a memory having a higher capacity is necessary and a calculation cost rises as the cost volume increases. Accordingly, the stereo match apparatus may set (or adjust) a maximum disparity range to a ¼ size. Furthermore, the stereo match apparatus may supplement the cost volume by performing regression (or regression analysis) on the cost volume in a subsequent step.

According to an embodiment of the present disclosure, stereo matching may be facilitated because the Atrous CNN uses feature maps having various levels.

Furthermore, in an embodiment of the present disclosure, a stacked 3D encoder-decoder CNN that normalizes a cost volume in order to perform regression analysis on feature information having various dimensions in addition to a disparity may be applied. This is described below with reference to this drawing.

FIG. 6 is a diagram illustrating the structure of the 3D encoder-decoder CNN according to an embodiment to which the present disclosure is applied.

A network according to an embodiment of the present disclosure may be stacked by three 3D encoder-decoder networks. A disparity map may be generated in each network. In an embodiment, each network may include a 3×3×3 convolutional layer that performs regression analysis on a cost volume.

Referring to FIG. 6, a first CNN layer 610 including the first four 3D CNNs plays a role of an encoder. In an embodiment, the first and third layers of the first CNN layer 610 may have their stride values set to 2. Accordingly, the size of a cost volume can be reduced.

Furthermore, in an embodiment, after each 3D CNN is applied, a batch normalization layer and/or a rectified linear unit layer may be subsequently applied.

Furthermore, in one embodiment, two 3D CNNs included in a second CNN layer 620 may have a 3×3×3 size. Furthermore, the second CNN layer 620 may be configured with a transposed convolutional network having a stride value of 2. The second CNN layer 620 may play a role of a decoder. Thereafter, the stereo match apparatus may up-sample a cost volume to a previous size (e.g., H*W*D) by applying bilinear interpolation.

The stereo match apparatus may calculate the probability of a cost value (e.g., Cd) and each disparity "d" using a soft max operation for consecutive disparity map estimation. The final disparity may be calculated as the sum of disparities to which a weight has been applied, as a probability such as Equation 1 below.

$$\hat{d} = \sum_{d=0}^{D_{max}\Sigma} d \times \sigma(-c_d) \quad (1)$$

The disparity regression analysis according to Equation 1 has an advantage in that it does not require a training parameter because it is non-differential, and has much improved performance than a stereo matching method based on classification.

In one embodiment, a smooth L1 loss function may be used to train a proposed network based on the disparity regression analysis. The smooth L1 loss function has excellent performance and is very effective in a singular value, and thus may be widely used for boundary box regression in order to detect an object.

For example, the aforementioned loss function may be defined like Equation 2.

$$(d, \hat{d}) = \frac{1}{N} \sum_{i=1}^{N} smooth_{L_1}(d_i - \hat{d}_i), \quad (2)$$

$$smooth_{L_1}(x) = \begin{cases} 0.5x^2, & \text{if } |x| < 1 \\ |x| - 0.5, & \text{otherwise} \end{cases}$$

In Equation 2, N is the number of labeled pixels, and d indicates a disparity.

FIG. 7 illustrates an example of an area to which the Atrous CNN is applied according to an embodiment to which the present disclosure is applied.

Referring to FIG. 7, a case where the Atrous CNN is applied to some area of an image of FIG. 7(a) is described as an example.

A block illustrated in FIG. 7(b) indicates an area to which a 3×3 CNN is applied. Blocks illustrated in FIGS. 7(c), 7(d), and 7(e) indicate areas having dilation levels of 4, 8 and 16, respectively. For example, FIGS. 7(b), 7(c), 7(d), and 7(e) may be a 1×1 convolutional layer having an Atrous value of 1, and 3×3 convolutional layers having respective Atrous values of 4, 8, and 16, respectively, with respect to the second CNN layer 420 of FIG. 4.

It may be seen that in the area illustrated in FIG. 7(b), an accommodation field is relatively smaller than those of other areas, context information is small, and a feature is not present or small. That is, wider and detailed information can be provided because the Atrous CNN has a wider accommodation field in order of FIGS. 7(c)→7(d)→7(e). Accordingly, if the outputs of a plurality of such Atrous CNNs are combined, a high level of a feature expression can be effectively obtained.

FIG. 8 is a flowchart illustrating a stereo matching method for generating a disparity map from a stereo image according to an embodiment of the present disclosure.

Referring to FIG. 8, the stereo matching apparatus obtains a cost volume by applying a first convolutional neural network (CNN) and a second CNN to a left image and a right image, respectively (S801). In this case, the cost volume may be determined based on feature maps extracted from the left image and the right image, respectively.

The stereo matching apparatus performs normalization on the cost volume by applying a third CNN (S802).

The stereo matching apparatus up-samples the normalized cost volume (S803).

The stereo matching apparatus obtains a disparity map by applying regression analysis to the up-sampled cost volume (S804).

As described above, the first CNN and the second CNN may include an Atrous CNN layer including an extended convolutional layer.

As described above, the Atrous CNN layer includes a plurality of convolutional layers having different Atrous values. The plurality of convolutional layers having the different Atrous values may be sequentially applied to a feature map output by a previous CNN layer.

As described above, the plurality of convolutional layers having the different Atrous values may be applied to areas having different sizes depending on the Atrous values.

As described above, the first CNN and the second CNN may share a weight applied to each input image.

As described above, the third CNN may be configured as a CNN using the 3D encoder-decoder.

As described above, the stereo matching method may further include the step of determining depth information of an object included in a stereo image based on the disparity map.

FIG. 9 illustrates a stereo matching apparatus 900 according to an embodiment of the present disclosure.

Referring to FIG. 9, the stereo matching apparatus 900 includes a sensor 901, a processor 902, and a memory 903. The sensor 901, the processor 902, and the memory 903 may be electrically connected and may communicate with each other.

The sensor 901 may photograph an image. In an embodiment, the sensor 901 may include a first sensor for photographing a stereo image and photographing a first viewpoint image and a second sensor for photographing a second viewpoint image. Each of the first sensor and the second sensor may be an image sensor, a proximity sensor or an infrared sensor, for example. The sensor 901 may photograph a stereo image using a well-known method (e.g., a method of converting an optical image into an electrical signal). The sensor 901 may transmit at least one of a photographed color image, depth image and infrared image to at least one of the processor 902 and the memory 903.

The processor 902 may process an operation related to the aforementioned stereo matching or conversion parameter estimation. In an embodiment, the processor 902 may convert the stereo image into feature maps using the feature extractor based on a neural network model, and may calculate a matching cost between pixels based on feature information included in the feature maps. The processor 902 may determine a pair of corresponding pixels in the stereo image based on the matching cost, and may estimate depth information based on a disparity between the pair of corresponding pixels.

In another embodiment, the processor 902 may extract feature points from images photographed at different times, and may determine feature vectors corresponding to the feature points using the feature extractor. Thereafter, the processor 902 may determine a pair of corresponding feature points in the images by comparing the feature vectors between the images, and may estimate a conversion parameter based on location information of the determined pair of correspondence feature points.

In addition, the processor 902 may perform at least one of the operations described with reference to FIGS. 1 to 8. The processor 902 may execute instructions or programs or control an image processor.

The memory 903 may store information used to estimate the aforementioned stereo matching or conversion parameter and resulting information. Furthermore, the memory 903 may store computer-readable instructions. When the instructions stored in the memory 903 are executed by the processor 902, the processor 902 may process the aforementioned one or more operations.

The stereo matching apparatus 900 may receive a user input or output an image and processing results through an input/output device (not illustrated). Furthermore, the stereo matching apparatus 900 is connected to an external device (e.g., a personal computer or a network) through a communication device (not illustrated) and may exchange data with the external device.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

Furthermore, in the case of an implementation by firmware or software, an embodiment of the present disclosure may be implemented in the form of a module, procedure or function for performing the aforementioned functions or operations, and may be stored in recording media readable through various computer means. In this case, the recording media may include program instructions, data files, data structures, etc. alone or in combination. The program instructions recorded in the recording medium may be specially designed and configured for the present disclosure or may be known and available to those having ordinary skill in the computer software field. For example, the recording media may include magnetic media such as a hard disk, a floppy disk and a magnetic tape, optical media such as a compact disc read only memory (CD-ROM) and a digital video disc (DVD), magneto-optical media such as a floptical disk, and a hardware device specially configured to store and execute program instructions, such as a ROM, a RAM, and a flash memory. Examples of the program instructions may include a high-level language code executable by a computer using an interpreter, in addition to a machine code, such as that produced by a compiler. Such a hardware device may be configured to operate as one or more software modules in order to perform an operation of the present disclosure, and vice versa.

Furthermore, the apparatus or device or the terminal according to the present disclosure may be driven by an instruction that enables one or more processors to perform the aforementioned functions and processes. For example, such an instruction may include an interpreted instruction or executable code, such as script instructions such as JavaScript or ECMAScript instructions, for example, or other instructions stored in a computer-readable medium. Furthermore, the apparatus or device according to the present disclosure may be implemented in a distributed form over a network, like a server farm, or may be implemented in a single computer device.

Furthermore, a computer program (also known as a program, software, a software application, a script, or a code) that is installed on the apparatus or device according to the present disclosure and that executes the method according to the present disclosure may also be written in any form of a compiled or interpreted language or a programming language, including a transcendental or procedural language, and may be deployed in any form, including an independent program or module, a component, a subroutine, or another unit suitable for being used in a computer environment. The computer program does not necessarily correspond to a file of a file system. The program may be stored within a single file provided to a requested program, within multiple files (e.g., files that store some of one or more modules, lower programs or codes) that interact with each other, or within part (e.g., one or more scripts stored in a markup language document) of a file including another program or data. The computer program may be placed in one site or may be distributed to a plurality of sites, and may be deployed to be executed on a single computer or multiple computers connected over a communication network.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art.

What is claimed is:

1. A stereo matching method for generating a disparity map from a stereo image, the method comprising:

obtaining a cost volume by applying a first convolutional neural network (CNN) and a second CNN to a first image and a second image, respectively, wherein the cost volume is determined based on feature maps extracted from the first image and the second image, respectively;

performing normalization on the cost volume by applying a third CNN;

up-sampling the normalized cost volume; and obtaining a disparity map by applying regression analysis to the up-sampled cost volume, wherein the first CNN includes a first Atrous CNN layer and the second CNN includes a second Atrous CNN layer, wherein the first Atrous CNN layer and the second Atrous CNN layer include a plurality of convolutional layers having different Atrous values, and wherein the plurality of convolutional layers having the different Atrous values are sequentially applied to a feature map output by a previous CNN layer.

2. The stereo matching method of claim 1, wherein the plurality of convolutional layers having the different Atrous values are applied to areas having different sizes based on the Atrous values.

3. The stereo matching method of claim 1, wherein the first CNN and the second CNN share a weight applied to each input image.

4. The stereo matching method of claim 1, wherein the third CNN is configured as a CNN using a three-dimensional (3D) encoder-decoder.

5. The stereo matching method of claim 1, further comprising determining depth information of an object included in the stereo image based on the disparity map.

6. A stereo matching apparatus comprising:

a processor configured to control the stereo matching apparatus;

a sensor coupled to the processor and configured to obtain a stereo image; and a memory coupled to the processor and configured to store data, wherein the processor is configured to:

obtain a cost volume by applying a first convolutional neural network (CNN) and a second CNN to a first image and a second image, respectively, wherein the cost volume is determined based on feature maps extracted from the first image and the second image, respectively, perform normalization on the cost volume by applying a third CNN, up-sample the normalized cost volume, and obtain a disparity map by applying regression analysis to the up-sampled cost volume, wherein the first CNN includes a first Atrous CNN layer and the second CNN includes a second Atrous CNN layer, wherein the first Atrous CNN layer and the second Atrous CNN layer include a plurality of convolutional layers having different Atrous values, and wherein the plurality of convolutional layers having the different Atrous values are sequentially applied to a feature map output by a previous CNN layer.

7. The stereo matching apparatus of claim 6, wherein the plurality of convolutional layers having the different Atrous values are applied to areas having different sizes based on the Atrous values.

8. The stereo matching apparatus of claim 6, wherein the first CNN and the second CNN share a weight applied to each input image.

9. The stereo matching apparatus of claim 6, wherein the third CNN is configured as a CNN using a three-dimensional (3D) encoder-decoder.

10. The stereo matching apparatus of claim 6, wherein the processor determines depth information of an object included in the stereo image based on the disparity map.

* * * * *